United States Patent
Kesavan et al.

(10) Patent No.: US 7,983,218 B2
(45) Date of Patent: Jul. 19, 2011

(54) TECHNIQUES TO SUPPORT SEAMLESS MOBILITY OF ELECTRONIC DEVICES ENGAGED IN A SESSION INITIATION PROTOCOL (SIP) SESSION

(75) Inventors: Vijay Sarathi Kesavan, Hillsboro, OR (US); Christian Maciocco, Portland, OR (US); Ng See Leng, Selangor (MY); Choong Khong Neng, Negeri Sembilan (MY)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 11/693,579

(22) Filed: Mar. 29, 2007

(65) Prior Publication Data

US 2008/0240091 A1 Oct. 2, 2008

(51) Int. Cl.
*H04W 4/00* (2009.01)
(52) U.S. Cl. .......................... 370/331; 370/332; 370/389
(58) Field of Classification Search .................. None
See application file for complete search history.

(56) References Cited

U.S. PATENT DOCUMENTS

| | | | |
|---|---|---|---|
| 6,771,964 B1 | 8/2004 | Einola et al. | |
| 2002/0082015 A1 * | 6/2002 | Wu | 455/436 |
| 2004/0233866 A1 * | 11/2004 | Bossoli et al. | 370/328 |
| 2004/0264410 A1 * | 12/2004 | Sagi et al. | 370/331 |
| 2005/0117556 A1 * | 6/2005 | Lee et al. | 370/338 |
| 2006/0072542 A1 | 4/2006 | Sinnreich et al. | |
| 2006/0230155 A1 | 10/2006 | Verma | |
| 2006/0276192 A1 * | 12/2006 | Dutta et al. | 455/436 |

FOREIGN PATENT DOCUMENTS

EP 1879361 1/2008

OTHER PUBLICATIONS

Office Action from 08250854.0-2413/ 1976228 mailed Nov. 21, 2009, 1 pg.
Office Action from 08250854.0-2413/ 1976228 mailed Oct. 12, 2009, 3 pgs.
Office Action for European Patent Application No. 08250854.0-2413/ 1976228 mailed Nov. 12, 2010, 9 pgs.
First Office Action for Chinese Patent Application No. 200810087494.6 mailed Aug. 3, 2010, 8 pgs.
IEEE 802.21/D04.00, Draft Standard for Local and Metropolitan Area Networks: Media Independent Handover Services; IEEE LAN MAN Standards Committee, (Feb. 2007), pp. 1-300.
Rosenberg, et al., "SIP: Session Initiation Protocol", Network Working Group, (Jun. 2002), pp. 1-252.

* cited by examiner

*Primary Examiner* — Chi H Pham
*Assistant Examiner* — Kouroush Mohebbi
(74) *Attorney, Agent, or Firm* — Blakely, Sokoloff, Taylor & Zafman LLP (57) ABSTRACT

Embodiments of the invention relate to techniques to allow a wireless device engaged in a Session Initiation Protocol (SIP) communication session to move between heterogeneous wireless networks without terminating the SIP session.

14 Claims, 6 Drawing Sheets

TECHNIQUES TO SUPPORT SEAMLESS MOBILITY OF ELECTRONIC DEVICES ENGAGED IN A SESSION INITIATION PROTOCOL (SIP) SESSION

TECHNICAL FIELD

Embodiments of the invention relate to wireless communications. More particularly, embodiments of the invention relate to techniques to allow a wireless device engaged in a Session Initiation Protocol (SIP) based communication session to move seamlessly between heterogeneous wireless networks without terminating the SIP session.

BACKGROUND

The Session Initiation Protocol (SIP) is a signaling protocol for creating, modifying and terminating sessions with one or more participants. SIP is defined in Request For Comments (RFC) 3261 published by the Internet Engineering Task Force (IETF) entitled, "SIP: Session Initiation Protocol," published in June 2002. SIP may be used, for example, as a signaling protocol for Voice over IP (VoIP). However, SIP may be used in any application where session initiation is a requirement.

SIP clients may use Transmission Control Protocol (TCP) or User Datagram Protocol (UDP) to connect to SIP servers and other SIP endpoints. TCP is defined in RFC 793 entitled, "Transmission Control Protocol," published in September 1981. UDP is defined in RFC 768 entitled, "User Datagram Protocol," published in August 1980.

Figure 1:
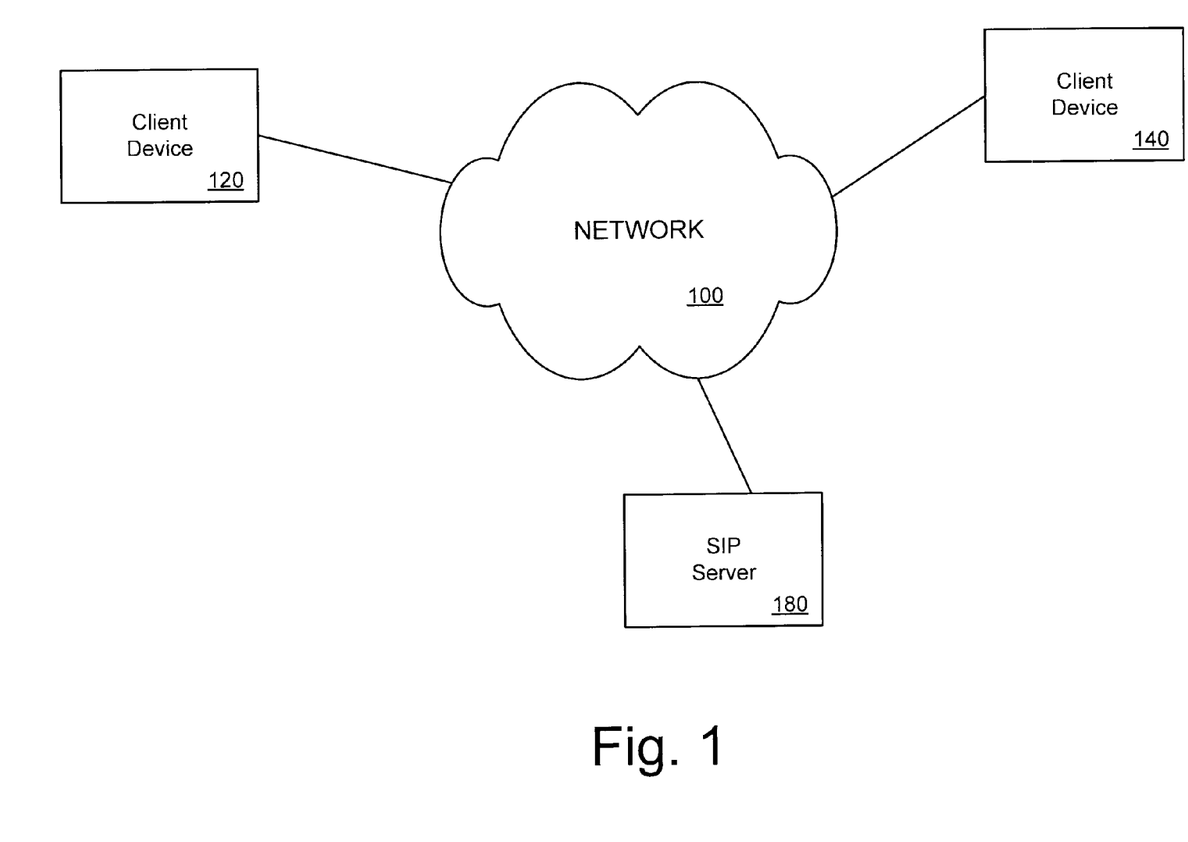
FIG. 1 is a block diagram of one embodiment of a network utilizing SIP.

FIG. 1 is a block diagram of one embodiment of a network utilizing SIP. A user of client device 120 may wish to communicate with a user of client device 140 over network 100, which may be, for example, the Internet or any other network. Prior to communicating both client device 120 and client device 140 register with SIP server 180. Registration provides SIP server with information related to client devices such as, for example, IP addresses for the respective client devices.

In order to initiate a session, client device 120 sends a request to SIP server 180 indicating another client device with which a session is to be initiated. SIP server 180 sends a message to client device 140 indicating that client device 120 is attempting to initiate a SIP session. Client device 140 may accept or reject the invitation by responding to SIP server 180.

If the invitation is accepted by client device 140, SIP server sends the appropriate information to client device 120. Once the session is initiated, client devices 120 and 140 communicate directly over network 100 until one of the client devices terminates the session through SIP server 180. While SIP allows communication between two client devices including wireless devices, SIP does not currently provide a mechanism to support all potential uses of SIP with wireless devices.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Mobile multi-radio devices like laptops, Ultra-Mobile PCs (UMPCs), cell phones and other cellular-enabled devices may be used for real-time interactive applications like VoIP, Instant Messaging (IM), with many of these applications using the Session Initiation Protocol (SIP) as the signaling and session mobility protocol. Once a session is established a change in session parameters is likely to result in changes that the end users can perceive (e.g. change of codec rate, type). When mobile devices move from one network to another, changes in the network characteristics might result in changes to the SIP session parameters from the session's IP address to the session's video/audio codec properties.

In IP networks, the IP addresses of the end points are key identifiers for the SIP sessions and a move to a different network will terminate the SIP session unless the SIP application takes appropriate actions. The new network characteristics can be different, requiring an adaptation of the audio/video rate/quality. For example, a user watching a video stream can move from a high capacity network like Wireless Local Area Network (WLAN) to a lower capacity network like Wireless Wide Area Network (WWAN) thus requiring sending lesser video information. In the following description, techniques to utilize a Connection Manager and SIP-based application support SIP sessions and enable seamless SIP application mobility are described. In general the Connection Manager resides on a client device having access to multiple networks and manages network connections by, for example, selecting a network to which the client device will connect, select connection parameters, etc.

In one embodiment, when mobile devices move from one network to another, the Connection Manager selects a network to connect to by considering parameters including, for example, cost of network access, network security, quality of service (QoS), data-rate, network reliability, device battery life, user-defined policies, in order to provide a seamless transition. Key parameters to consider are the applications' bandwidth and QoS requirements among others.

Figure 2:
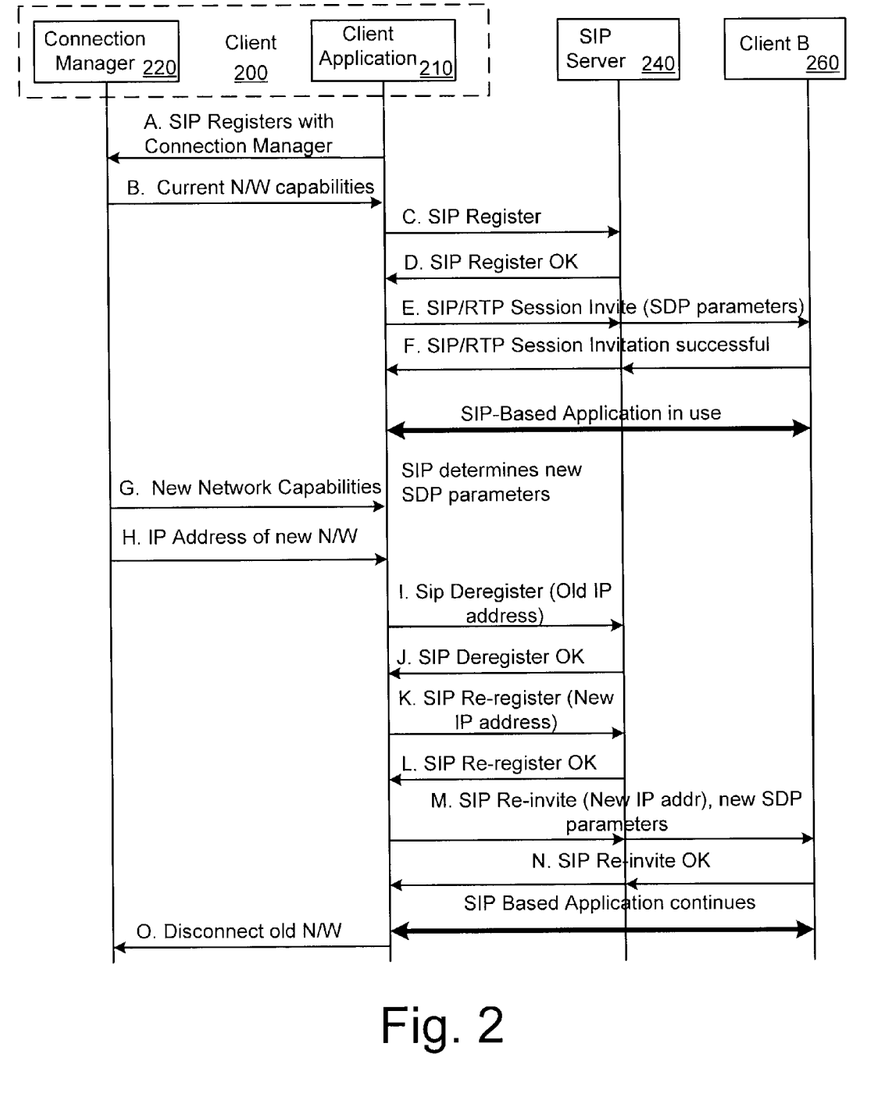
FIG. 2 illustrates one embodiment of an exchange of information between a SIP-based application and a connection manager to support SIP mobility awareness.

FIG. 2 illustrates an exchange of information between a SIP-based application and a connection manager to support SIP mobility awareness. SIP client application 210 on client device 200 establishes a SIP session with client device 260, registers with connection manager 220 and queries for the capabilities of the connected network(s).

In one embodiment, client application 210 performs a SIP registration with connection manager 220 (Message A). In response, connection manager 220 informs client application 210 of current network capabilities (Message B). These properties may be gathered from multiple inputs (e.g. querying network devices, etc).

Based on the network capability information client application 210 on client device 200 adapts the session description parameters appropriately and conveys the information to a counterpart client on client device 260 using the Session Description Protocol (SDP), defined in RFC 4566, or other appropriate protocol.

In one embodiment, client application sends a SIP register message to SIP server 240 (Message C). In response SIP server 240 accepts the SIP register message by sending a SIP Register OK message to client application 210 (Message D). Upon completion of the registration process, client application 210 may send a SIP Session Invite message to client device 260 via SIP server 240 (Message E). The Session Invite message may include SDP parameters to be used in for the SIP session.

In response to the Session Invite message, client device 260 may reply with a SIP Session Invitation Successful message to client application 210 via SIP server 240 (Message F). At this point, the SIP session is established and client device 200 may communicate with client 260 directly over the network, maybe using Realtime Transmission Protocol (RTP), as defined in RFC 3350.

Sometime later due to device mobility or external/internal condition changes connection manager 220 may select a new network to connect to. At this point, if connection manager 220 disconnects from the current network and connects to the new network it will break the on-going SIP session. Instead, as shown in FIG. 2, connection manager 220 provides the network capabilities of the new network to client application 210 (Message G).

Client application 210 may then determine the new SDP parameters to be used. Once client application 210 gets the IP address of the new network from connection manager 220 (Message H), client application 210 deregisters the old IP address and re-registers the new IP address. Deregistering the old SIP address does not affect the data traffic flow (which can use a RTP session) from client device 200 to client device 260. Client application 210 on client device 200 then sends a SIP re-invite to the SIP client on client device 260 with the new IP address and the new SDP parameters to establish a new SIP session. This series of events results in a make-before-break model to enable seamless mobility for a SIP based applications. Make-before-break refers to a process in which a second SIP connection is established between clients and the SIP session traffic is transferred to the second connection before the first SIP connection is broken. This allows a seamless transfer between network so that, for example, a VoIP call is not dropped when a network change occurs.

In one embodiment, to de-register the original IP address for client device 200, client application 210 may send a SIP Deregister message to SIP server 240 (Message I). SIP server 240 may respond with a SIP Deregister OK message to client application 210 (Message J).

In one embodiment, client application 210 sends a SIP Re-Register message to SIP server 240 with the IP address for the new network (Message K). In response SIP server 240 accepts the SIP Re-Register message by sending a SIP Re-Register OK message to client application 210 (Message L).

Upon completion of the re-registration process, client application 210 may send a SIP Session Re-Invite message with the new IP address to client device 260 via SIP server 240 (Message M). The Session Re-Invite message may include the new SDP parameters to be used in for the SIP session. In response to the Session Re-Invite message, client device 260 may send a SIP Session Re-Invitation Successful message to client application 210 via SIP server 240 (Message N).

At this point, the SIP session continues utilizing the new network. Client application 210 may then disconnect from the original network (Message O). The result of this process is a make-before-break SIP connection that allows a wireless device to move seamlessly between wireless networks without losing previously established SIP session.

The above example illustrates how SIP clients may interact with the Connection Manager to get SDP information and adapt the SIP session while performing a make-before-break operation and provide seamless transition of the SIP session from one network to another, a key requirement for multi-radio devices supporting real-time packet based applications, e.g. VoIP.

Figure 3:
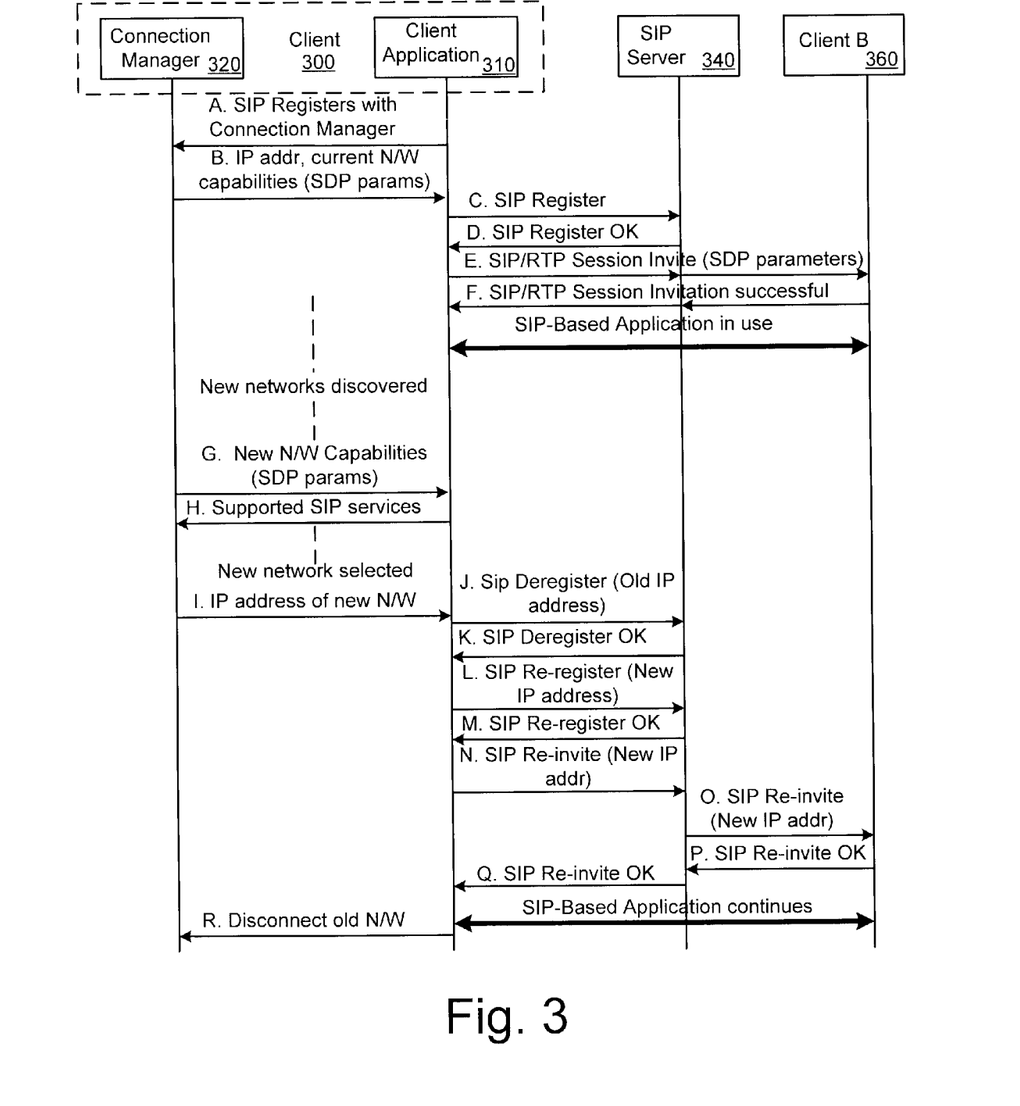
FIG. 3 illustrates another embodiment of an exchange of information between a SIP-based application and a connection manager to support SIP mobility awareness.

In the above description the Connection Manager provides the SIP client with the network information and the SIP client uses it to evaluate the new SDP parameters and adapt the session. That is, the intelligence is in the SIP client. FIG. 3 shows a variation in the interaction where the connection manager provides network capability information to the SIP client which determines if the network is suitable for SIP sessions or not and informs the connection manager what services can be supported on the network. This may be considered a hybrid model where intelligence is both with the SIP application as well as the Connection Manager.

In one embodiment, SIP client application 310 performs a registration with connection manager 320 (Message A). In response, connection manager 320 informs client application 310 of current network capabilities (Message B) using standardized Session Description Protocol (SDP) parameters. These parameters may be gathered from multiple inputs (e.g. querying network devices, querying an IEEE 802.21 compliant Information Server or other repository of networks and their capabilities). IEEE 802.21 refers to a proposed standard that supports seamless handover between networks of the same type as well as handover between different network types also called Media Independent Handover (MIH) or vertical handover. The standard provides information to allow handing over to and from cellular, GSM, GPRS, WiFi, Bluetooth and 802.11 networks through different handover mechanisms.

In one embodiment, client application sends a SIP register message to SIP server 340 (Message C). In response SIP server 340 accepts the SIP register message by sending a SIP Register OK message to client application 310 (Message D). Upon completion of the registration process, client application 310 may send a SIP Session Invite message to client device 360 via SIP server 340 (Message E). The Session Invite message may include SDP parameters to be used in for the SIP session.

In response to the Session Invite message, client device 360 may send a SIP Session Invitation Successful message to client application 310 via SIP server 340 (Message F). At this point, the SIP session is established and client device 200 may communicate with client 360 directly over the network.

Sometime later due to device mobility or external/internal condition changes connection manager 320 may select a new network to connect to. At this point, if connection manager 320 disconnects from the current network it will break the on-going SIP session. Instead, as shown in FIG. 3, connection manager 320 provides the network capabilities of the new network to client application 310 (Message G) and can use SDP parameters to provide network capability.

In response to receiving the new network capabilities, client application 310 may send a message to connection manager indicating the SIP services supported by client application 310 (Message H). Connection manager 320 may utilize the listing of supported SIP services to select a new network to use. Connection manager 320 may inform client application 310 the IP address for the new network (Message I).

In one embodiment, to de-register the original IP address for client device 300, client application 310 may send a SIP Deregister message to SIP server 340 (Message J). SIP server 340 may respond with a SIP Deregister OK message to client application 310 (Message K).

In one embodiment, client application 310 sends a SIP Re-Register message to SIP server 340 with the IP address for the new network (Message L). In response SIP server 340 accepts the SIP Re-Register message by sending a SIP Re-Register OK message to client application 310 (Message M).

Upon completion of the re-registration process, client application 310 may send a SIP Session Re-Invite message with the new IP address to client device 360 via SIP server 340 (Messages N and O). The Session Re-Invite message may include the new SDP parameters to be used in for the SIP session. In response to the Session Re-Invite message, client device 360 may send a SIP Session Re-Invitation Successful message to client application 310 via SIP server 240 (Messages P and Q).

At this point, the SIP session continues utilizing the new network. Client application 310 may then disconnect from the original network (Message R). The result of this process is a make-before-break SIP connection that allows a wireless device to move seamlessly between wireless networks without losing previously established SIP session.

It is also possible for the SIP client to provide its capabilities to the Connection Manager using SDP parameters so that the connection manager can use the information to select a new network. In this model the intelligence is with the Connection Manager. There is flexibility in the scheme in order to support various models based on operator or ISV preferences.

Figure 4:
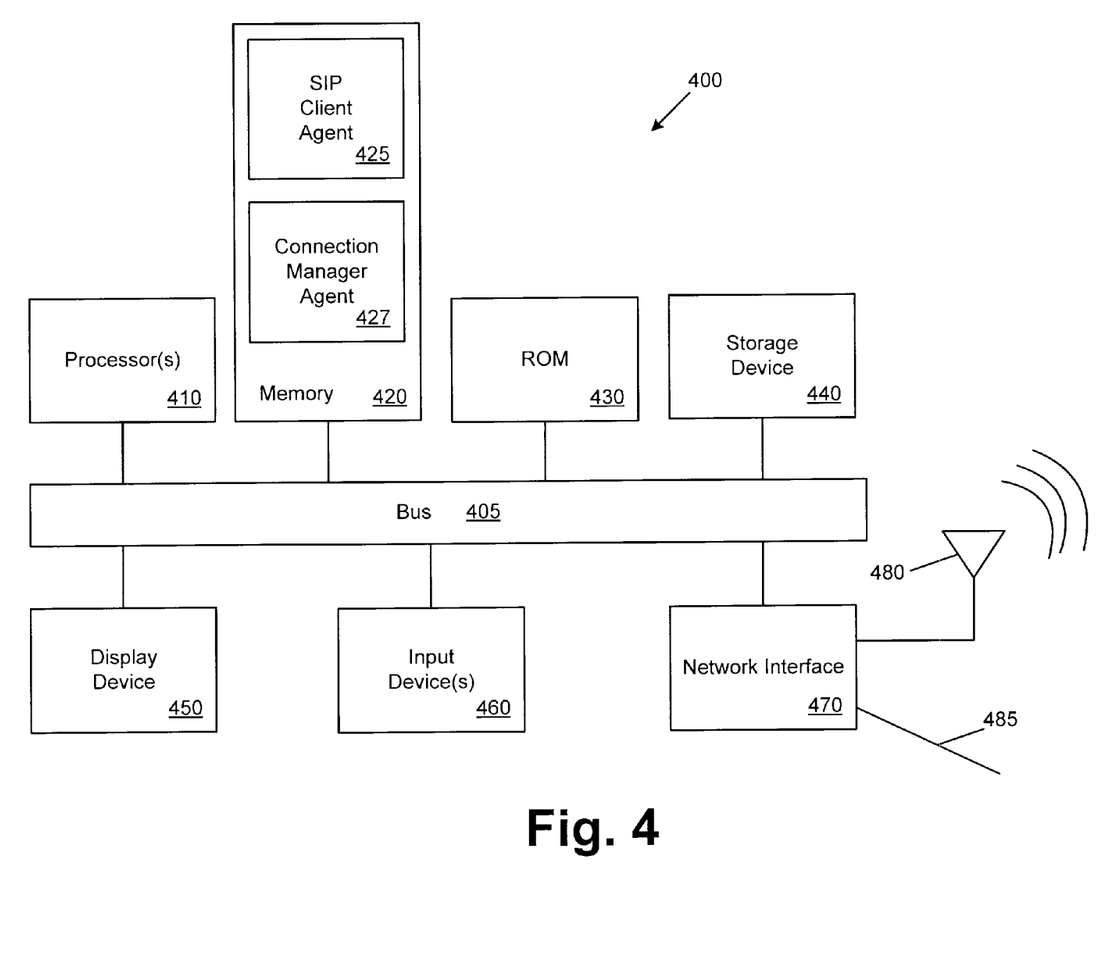
FIG. 4 is a block diagram of one embodiment of an electronic device.

FIG. 4 is a block diagram of one embodiment of an electronic device. The electronic device illustrated in FIG. 4 is intended to represent a range of electronic devices including, for example, the client devices discussed above. Alternative electronic devices can include more, fewer and/or different components. In one embodiment the electronic device of FIG. 4 is a desktop or a laptop computer system. In one embodiment, the electronic device of FIG. 4 is a mobile device, for example, a laptop, an Ultra Mobile PC (UMPC, a smartphone or other cellular-enabled device. In one embodiment, UMPC refers to a small form factor tablet computing device.

Electronic system 400 includes bus 405 or other communication device to communicate information, and processor 410 coupled to bus 405 to process information. While electronic device 400 is illustrated with a single processor, electronic device 400 can include multiple processors and/or co-processors. Electronic device 400 further includes random access memory (RAM) or other dynamic storage device 420 (referred to as memory), coupled to bus 405 to store information and instructions to be executed by processor 410. Memory 420 also can be used to store temporary variables or other intermediate information during execution of instructions by processor 410.

In one embodiment, memory 420 may include SIP client agent 425 and/or connection manager agent 427. SIP client agent 425 may provide the functionality of the SIP client applications described above. SIP client agent 425 may be implemented as hardware, software, firmware, or any combination thereof. Connection manager agent 427 may provide the functionality of the connection manager applications described above. Connection manager agent 427 may be implemented as hardware, software, firmware, or any combination thereof.

Electronic device 400 also includes read only memory (ROM) and/or other static storage device 430 coupled to bus 405 to store static information and instructions for processor 410. Data storage device 440 is coupled to bus 405 to store information and instructions. Data storage device 440 such as a magnetic disk or optical disc and corresponding drive can be coupled to electronic device 400.

Electronic device 400 can also be coupled via bus 405 to display device 450, such as liquid crystal display (LCD) or other display device, to display information to a user. Input device(s) 460 may include keys, a mouse, a trackball, or other input devices and may be coupled to bus 405 to communicate information and command selections to processor 410. Electronic device 400 further includes network interface 470 to provide access to a network, such as a local area network. Network interface 470 may include one or more antennae 480 to communicate utilizing wireless protocols and/or cable 485 to communicate utilizing wired protocols.

Instructions are provided to memory from a computer-readable storage device, such as magnetic disk, a read-only memory (ROM) integrated circuit, CD-ROM, DVD, flash memory, via a remote connection (e.g., over a network via network interface 470) that is either wired or wireless, etc. In alternative embodiments, hard-wired circuitry can be used in place of or in combination with software instructions. Thus, execution of sequences of instructions is not limited to any specific combination of hardware circuitry and software instructions.

Figure 5:
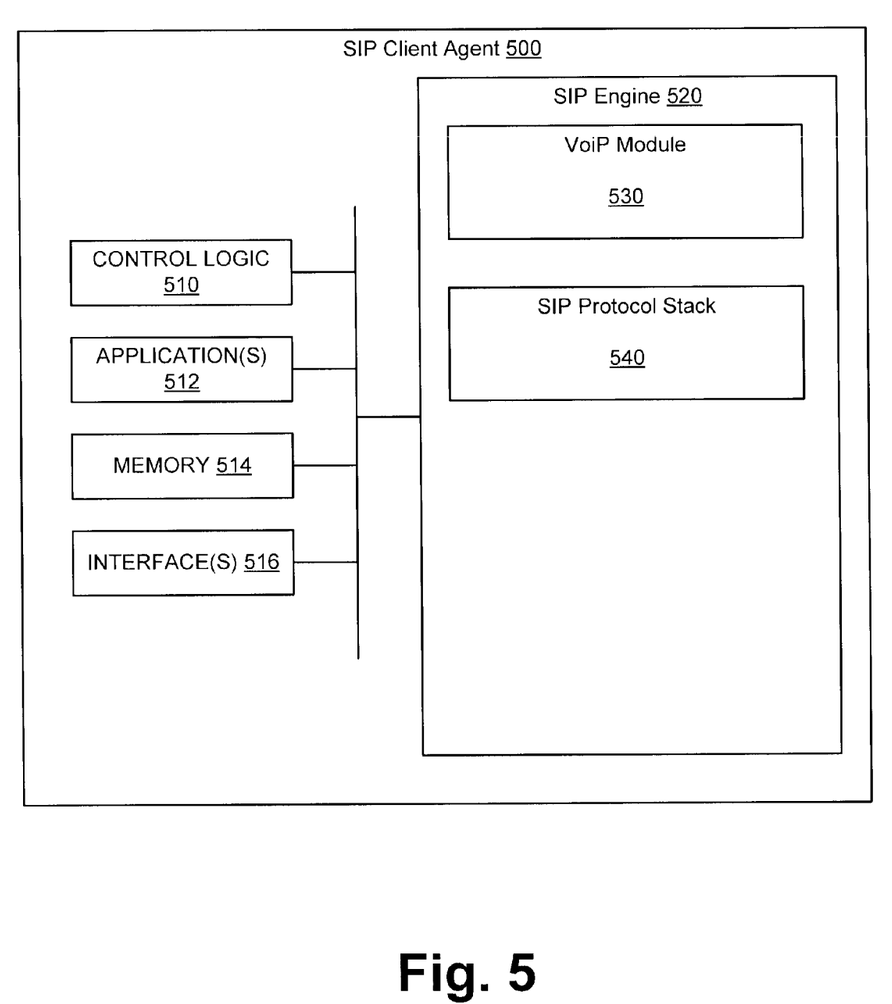
FIG. 5 is a block diagram of one embodiment of a SIP client agent that may be resident on a client device.

FIG. 5 is a block diagram of one embodiment of a SIP client agent that may be resident on a client device. SIP client agent 500 includes control logic 510, which implements logical functional control to direct operation of SIP client agent 500, and/or hardware associated with directing operation of SIP client agent 500. Logic may be hardware logic circuits and/or software routines. In one embodiment, SIP client agent 500 includes one or more applications 512, which represent code sequence and/or programs that provide instructions to control logic 510.

SIP client agent 500 includes memory 514, which represents a memory device and/or access to a memory resource for storing data and/or instructions. Memory 514 may include memory local to SIP client agent 500, as well as, or alternatively, including memory of the host system on which SIP client agent 500 resides. SIP client agent 500 also includes one or more interfaces 516, which represent access interfaces to/from (an input/output interface) SIP client agent 500 with regard to entities (electronic or human) external to SIP client agent 500.

SIP client agent 500 also includes SIP engine 520, which represents one or more functions that enable SIP client agent 500 to provide SIP-based services for a host device. SIP engine 520 may include Voice over IP (VoIP) module 530 that provides VoIP communications utilizing SIP services. SIP engine 520 may also include SIP protocol stack 530 for use in SIP compliant communications. Additional modules may also be supported. These additional modules may, for example, support RTP interaction and/or TCP/IP interaction. As used herein, a module refers to routine, a subsystem, etc., whether implemented in hardware, software, or some combination.

Figure 6:
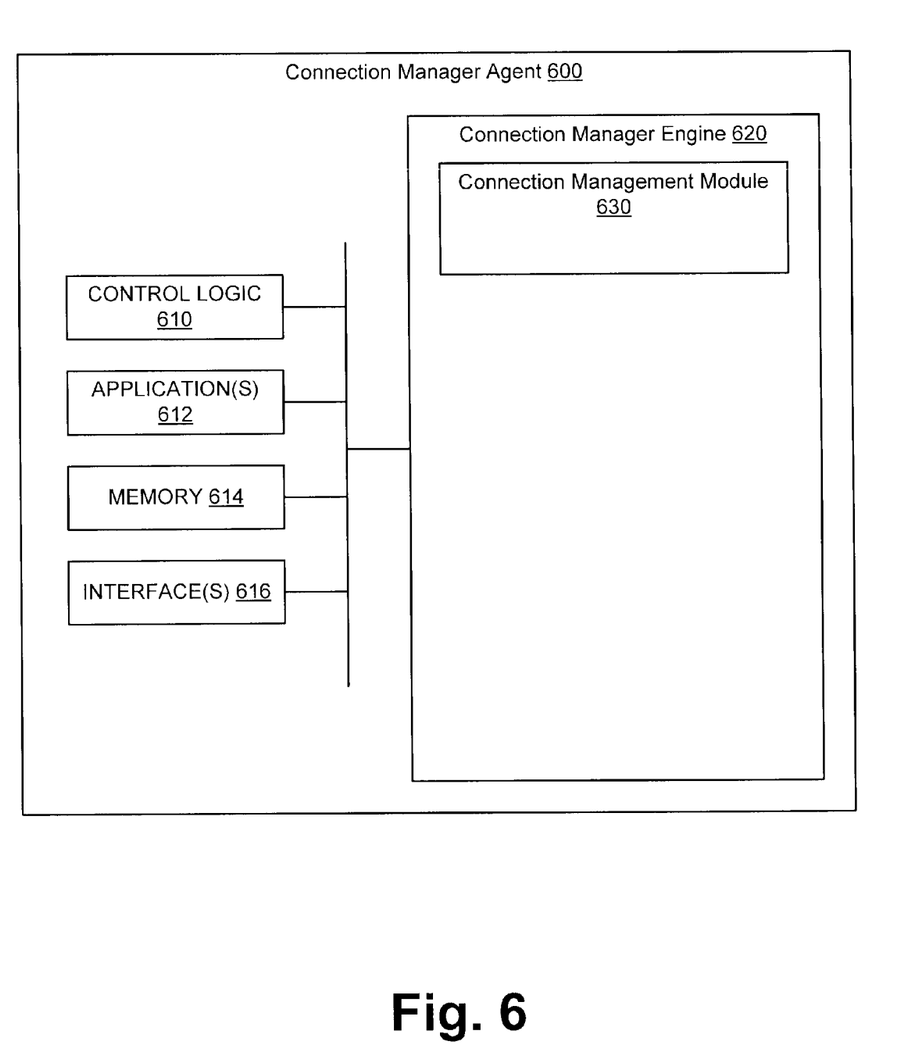
FIG. 6 is a block diagram of one embodiment of a connection manager agent that may be resident on a client device.

FIG. 6 is a block diagram of one embodiment of a connection manager agent that may be resident on a client device. Connection manager agent 600 includes control logic 610, which implements logical functional control to direct operation of connection manager agent 600, and/or hardware associated with directing operation of connection manager agent 600. Logic may be hardware logic circuits and/or software routines. In one embodiment, connection manager agent 600 includes one or more applications 612, which represent code sequence and/or programs that provide instructions to control logic 610.

Connection manager agent 600 includes memory 614, which represents a memory device and/or access to a memory resource for storing data and/or instructions. Memory 614 may include memory local to connection manager agent 600, as well as, or alternatively, including memory of the host system on which connection manager agent 600 resides. Connection manager agent 600 also includes one or more interfaces 616, which represent access interfaces to/from (an input/output interface) connection manager agent 600 with regard to entities (electronic or human) external to connection manager agent 600.

Connection management agent 600 also includes connection manager engine 620, which represents one or more functions that enable connection management agent 600 to provide connection management services for a host device. Connection management engine 620 may include connection management module 630 that provides management of connections to wired and/or wireless networks as described above. Additional modules may also be supported. As used herein, a module refers to routine, a subsystem, etc., whether implemented in hardware, software, or some combination.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    establishing, with a client device having a client application and a connection manager, a first Session Initiation Protocol (SIP) compliant connection with a remote device utilizing a first communications protocol over a first network by:
        registering the client application with the connection manager,
        providing, with the connection manager to the client application, at least a network address and network capabilities,
        registering the client device with a SIP server,
        initiating a SIP connection with the remote device;
    transmitting from the connection manager to the client application, an indication of changes in network conditions corresponding to the first connection;
    selecting a new network based on capabilities of the new network, wherein the new capabilities of the new network are indicated by at least Session Description Protocol (SDP) parameters;
    discovering services available over a second network;
    establishing, with the client device in response to the indication from the connection manager, a second SIP compliant connection utilizing a second communications protocol via the intermediate server over the second network by:
        registering the client application with the remote device using an address corresponding to the new network,
        deregistering the client application with the remote device using an address corresponding to the old network,
        re-registering the client application with the remote device using the address corresponding to the new network;
    terminating the first SIP compliant connection between the client device and the remote device after the second SIP compliant connection has been established, wherein a communication session initiated over the first connection is transferred to the second connection prior to termination of the first connection.

2. The method of claim 1 wherein the connection carries Voice Over IP (VoIP) compliant traffic.

3. The method of claim 1 wherein the first communications protocol and the second communications protocol comprise a first wireless communications protocol and a second wireless communications protocol, respectively.

4. The method of claim 1 wherein network characteristics are communicated utilizing a Session Description Protocol (SDP) compliant transaction.

5. The method of claim 1 wherein establishing, with a client device, a first SIP compliant connection with a remote device utilizing a first communications protocol via an intermediate server comprises:
    a Session Initiation Protocol (SIP) compliant agent registering with a connection management agent;
    the SIP compliant agent receiving from the connection management agent an indication of current network capabilities, wherein the connection management agent determines capabilities for one or more available networks and selects a network for the first connection;
    the SIP compliant agent registering with a SIP server by transmitting SIP compliant messages utilizing the first communications protocol;
    the SIP compliant agent sending an invitation to the remote device by transmitting SIP compliant messages utilizing the first communications protocol.

6. The method of claim 1 wherein establishing, with a client device, a first SIP compliant connection with a remote device utilizing a first communications protocol via an intermediate server comprises:
    a Session Initiation Protocol (SIP) compliant agent registering with a connection management agent;
    the SIP compliant agent receiving from the connection management agent an indication of current network capabilities, wherein the SIP compliant agent selects the network for the first connection based, at least in part, on network capabilities for one or more networks provided by the connection management agent;
    the SIP compliant agent registering with a SIP server by transmitting SIP compliant messages utilizing the first communications protocol;
    the SIP compliant agent sending an invitation to the remote device by transmitting SIP compliant messages utilizing the first communications protocol.

7. An article comprising a tangible non-transitory computer-readable medium having stored thereon instructions that, when executed, cause one or more processors to:
    establish, with a client device having a client application and a connection manager, a first Session Initiation Protocol (SIP) compliant connection with a remote device utilizing a first communications protocol over a first network, by:
        registering the client application with the connection manager, providing, with the connection manager to the client application, at least a network address and network capabilities,
registering the client device with a SIP server,
initiating a SIP connection with the remote device;
transmit from the connection manager to the client application, an indication of changes in network conditions corresponding to the first connection;
select a new network based on capabilities of the new network, wherein the new capabilities of the new network are indicated by at least Session Description Protocol (SDP) parameters;
discover services available over a second network;
establish, with the client device in response to the indication from the connection manager, a second SIP compliant connection utilizing a second communications protocol via the intermediate server over the second network by:
registering the client application with the remote device using an address corresponding to the new network,
deregistering the client application with the remote device using an address corresponding to the old network,
re-registering the client application with the remote device using the address corresponding to the new network;
terminate the first SIP compliant connection between the client device and the remote device after the second SIP compliant connection has been established, wherein a communication session initiated over the first connection is transferred to the second connection prior to termination of the first connection.

8. The article of claim 7 wherein the first communications protocol and the second communications protocol comprise a first wireless communications protocol and a second wireless communications protocol, respectively.

9. The article of claim 7 wherein the instructions that cause the one or more processors to establish, with a client device, a first SIP compliant connection with a remote device utilizing a first communications protocol via an intermediate server comprise instructions that, when executed, cause the one or more processors to:
cause a Session Initiation Protocol (SIP) compliant agent to register with a connection management agent;
cause the SIP compliant agent to receive, from the connection management agent, an indication of current network capabilities, wherein the connection management agent determines capabilities for one or more available networks and selects a network for the first connection;
cause the SIP compliant agent to register with a SIP server by transmitting SIP compliant messages utilizing the first communications protocol;
cause the SIP compliant agent to send an invitation to the remote device by transmitting SIP compliant messages utilizing the first communications protocol.

10. The article of claim 7 wherein the instructions that cause the one or more processors to establish, with a client device, a first SIP compliant connection with a remote device utilizing a first communications protocol via an intermediate server comprise instructions that, when executed, cause the one or more processors to:
cause a Session Initiation Protocol (SIP) compliant agent to register with a connection management agent;
cause the SIP compliant agent to receive from the connection management agent an indication of current network capabilities, wherein the SIP compliant selects the network for the first connection based, at least in part, on network capabilities for one or more networks provided by the connection management agent;
cause the SIP compliant agent to register with a SIP server by transmitting SIP compliant messages utilizing the first communications protocol;
cause the SIP compliant agent to send an invitation to the remote device by transmitting SIP compliant messages utilizing the first communications protocol.

11. A system comprising:
a network interface to send and receive data according to at least a first communications protocol on a first network and a second communications protocol on a second network;
a connection management agent communicatively coupled with the network interface to determine one or more network characteristics and to generate an indication of a change in the one or more network characteristics for connections over the first network, wherein the indication comprises at least Session Description Protocol (SDP) parameters;
a Session Initiation Protocol (SIP) compliant agent communicatively coupled with the connection management agent and the network interface to establish a first connection with a remote device utilizing a first communications protocol via the first network by registering the client application with the connection manager, providing, with the connection manager to the client application, at least a network address and network capabilities, registering the client device with a SIP server, initiating a SIP connection with the remote device, establish a second connection with the remote device utilizing a second communications protocol via the second network in response to the indication of change from the connection management agent and terminate the first connection between the client device and the remote device after the second connection has been established by registering the client application with the remote device using an address corresponding to the new network, deregistering the client application with the remote device using an address corresponding to the old network, re-registering the client application with the remote device using the address corresponding to the new network, the first connection and the second connection to carry real-time interactive application data.

12. The system of claim 11 wherein the connection with the remote device comprises a Session Initiation Protocol (SIP) compliant connection.

13. The system of claim 12 wherein the connection carries Voice Over IP (VoIP) compliant traffic.

14. The system of claim 11 wherein network characteristics are communicated utilizing a Session Description Protocol (SDP) compliant transaction.

* * * * *